(12) United States Patent
Finzel et al.

(10) Patent No.: US 6,527,478 B2
(45) Date of Patent: Mar. 4, 2003

(54) CANAL OR PIPE SYSTEM AS WELL AS PROCESS FOR INSTALLATION OF A CABLE OR EMPTY PIPE INTO A CANAL OR PIPE SYSTEM

(75) Inventors: Lothar Finzel, Unterschleißheim (DE); Jorge Serrano, Hickory, NC (US)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/930,527

(22) Filed: Aug. 15, 2001

(65) Prior Publication Data

US 2002/0131825 A1 Sep. 19, 2002

(30) Foreign Application Priority Data

Mar. 13, 2001 (DE) .......................... 101 11 960

(51) Int. Cl.⁷ ................. F16L 3/00; F16L 7/00
(52) U.S. Cl. ................. 405/184.4; 405/183.5; 248/49
(58) Field of Search .................. 405/183.5, 184.1, 405/184.2, 184.4; 138/37, 40, 89; 248/49

(56) References Cited

U.S. PATENT DOCUMENTS 3,873,391 A * 3/1975 Plauka et al. ............... 156/258
4,647,251 A * 3/1987 Gale ............................ 248/49
4,822,211 A * 4/1989 Shinoda et al. .............. 248/71
5,499,737 A * 3/1996 Kraus .......................... 138/89
6,134,766 A * 10/2000 Sievert ....................... 138/128
6,247,499 B1 * 6/2001 Lauzon ....................... 138/143

FOREIGN PATENT DOCUMENTS

| DE | 10018380 A1 | 10/2001 | .......... F16L/55/162 |
| EP | 0936479 A1 | 8/1999 | .......... G02B/6/00 |
| EP | 0942504 A1 | 9/1999 | .......... H02G/1/08 |
| EP | 1148603 A2 | 10/2001 | .......... H02G/1/08 |

* cited by examiner

Primary Examiner—Robert E. Pezzuto
Assistant Examiner—Tara L. Mayo

(57) ABSTRACT

For installation, a cable (5, 17) or empty pipe is anchored in a canal or pipe system (1, 3) at a minimum of 2 anchoring points (2) along the longitudinal direction of the canal or pipe system. The cable (5, 17) or an empty pipe and at least one holding device (12, 21) fastened to the inner wall (16) of the canal or pipe system are installed in the area of a branch point (6) in such a way, that the cable or empty pipe are guided around the branch point by means of the holding device and due to their defined pre-tension. The installation can be done comparatively quickly and easily, and after installation the function of the branch point, for example, in the form of an inlet canal, is not diminished.

18 Claims, 10 Drawing Sheets

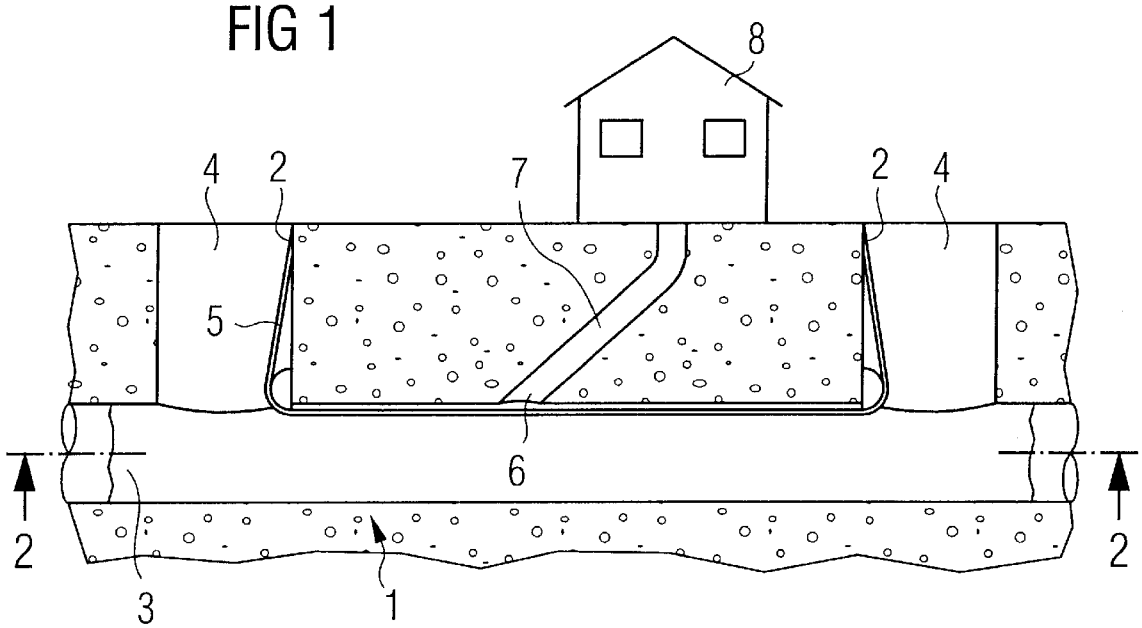
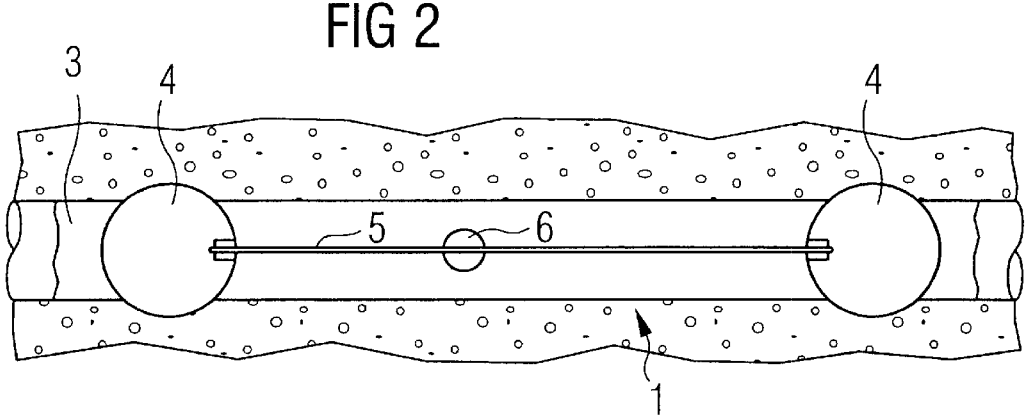

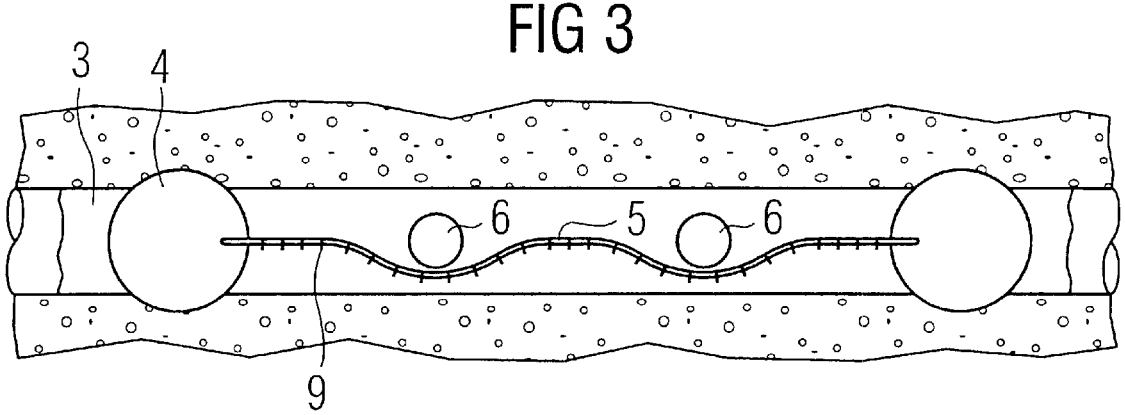
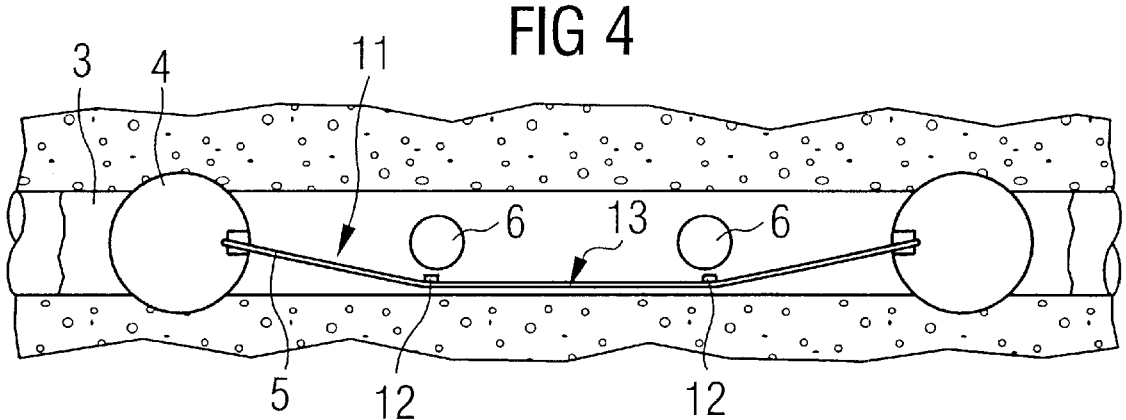
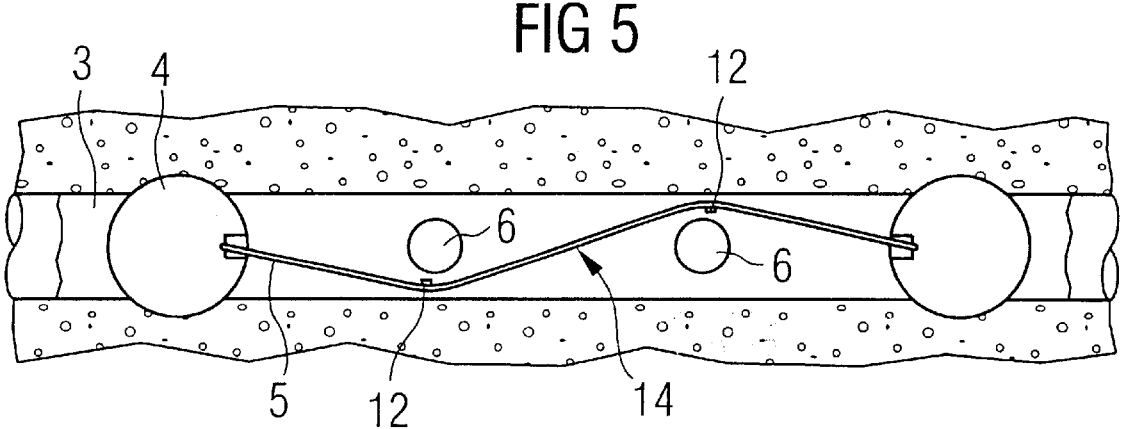

CANAL OR PIPE SYSTEM AS WELL AS PROCESS FOR INSTALLATION OF A CABLE OR EMPTY PIPE INTO A CANAL OR PIPE SYSTEM

FIELD OF THE INVENTION

The present invention concerns a canal or pipe system as well as a process for the installation of a cable or an empty pipe into a canal or pipe system.

BACKGROUND OF THE INVENTION

For certain applications it is usual to insert a cable, for example, in the form of a coaxial or optical cable, or an empty pipe into an existing or new canal or pipe system. Such a canal or pipe system is constructed, for example, in the form of a waste water canal system, which shows entry shafts and several branching points at several points. The waste water canal system can be entered from the outside at the entry shafts; at the branching points, inlets from the participants of the waste water canal system can flow in. An installation of cables or empty pipes into an existing waste water canal is an especially cost saving variation for later installation of cables or empty pipes. In the case in which an empty pipe is installed, a cable can later be inserted into the pipe.

Especially in a waste water canal system, it is usual for branch points, for example, of inlets from the various participants, to flow into the main canal at different positions and in different arrangements relative to the main canal. Therefore it is possible, that a cable or empty pipe that is installed later can block branch points positioned at certain points and thus lead to a blockage of their functions, for example, water backwash or dirt deposits are possible at such points.

A cable or an empty pipe can be inserted into a canal or pipe system by means of an installation robot. The robot has to be constructed in such a way and has to be controlled from the outside in such a way, that such a cable or pipe is fastened to a number of fastening points on an inner wall of the canal or pipe system, and that it is guided around a respective branch point, which could block the cable or pipe. A robot constructed in such a way is comparatively expensive to manufacture and additionally such an installation process is comparatively time consuming.

SUMMARY OF THE INVENTION

An objective of the present invention is to provide a process for the installation of a cable or an empty pipe into a canal or pipe system, which can be executed comparatively quickly and easily, and which makes it possible, that the function of a branch point, for example, in the form of an inlet canal, is not diminished.

Additionally, an objective of the present invention is a canal or pipe system with an installed cable or empty pipe, where the function of a branch point is not diminished by the cable or empty pipe.

The objective concerning the process is solved by a process for the installation of a cable or empty pipe into a canal or pipe system, where a cable or empty pipe is anchored at a minimum of two anchoring points along the longitudinal direction of the canal or pipe system, where the cable or empty pipe and at least one holding device fastened to the inside wall of the canal or pipe system is installed in the area of the branch point in such a way, that the cable or empty pipe is guided around the branch point in a defined way by means of the holding device and due to its pre-tension.

The objective concerning the canal or pipe system is solved by a canal or pipe system, where a cable or empty pipe is anchored at a minimum of two anchoring points in the longitudinal direction of the canal or pipe system, where the cable or empty pipe in the area of a branch point is guided in a defined way around the branch point by means of at least one holding device on the inner wall of the canal or pipe system and by its pretension.

With the present invention, a cable or empty pipe is subsequently installed into the canal or pipe system, and is guided around a branch point, for example, in the form of an inlet canal flowing in from above, with simultaneous fastening of the cable or empty pipe, without blocking the branch point or diminishing its function. The cable or empty pipe is anchored between two anchoring points, which are, for example, fastened at two entry shafts. The tension will guide the cable or empty pipe along the shortest path between the two entry shafts. In this case, without provision of holding devices, possible inlets flowing in from above would be blocked by the cable or empty pipe, which could lead to a blockage or water backwash. According to the invention, the cable is guided around each branch point by means of the holding device and its pre-tension. One holding device at each branch point is sufficient; with it the cable or empty pipe is steered away from its path predetermined by the pre-tension, so that the cable or empty pipe does not block the branch point.

The process according to the invention can be executed comparatively quickly and easily, since the cable or empty pipe is anchored between two anchoring points. Since the anchoring points are preferably at entry shafts of the canal or pipe system, which can be easily entered from the outside, no installation robot mentioned previously is necessary. Additionally it is not necessary, that such a robot install the cable or empty pipe at a multitude of fastening points along the longitudinal direction of the canal or pipe system, and guide it around individual branch points by means of several fastening elements.

It is preferable for the cable or empty pipe to position itself during insertion or anchoring; and it is guided around each branch point by means of a hook-like or clamp-like fastening element.

The holding device can be set at each branch point by means of a robot. Such a robot can be constructed in a simpler manner than the installation robot, which, as described above, fastens a cable together with each fastening element at a multitude of points at the inner wall of the canal or pipe system. The function of the holding device can be achieved by a number of different variations, which are characterized by the fact that they can be installed with and without a robot. The holding device is constructed in such a way, that the cable or empty pipe enters in a spring-like manner, or is positioned by its own weight or by the pre-tension of the cable or empty pipe during insertion.

In an example of the process according to the invention, the cable or empty pipe is inserted, the holding device is installed at the inner wall, and subsequently the cable or empty pipe is fastened to the holding device. Since these steps have to be carried out subsequently, a robot or other auxiliary means can be used which can be constructed in a comparatively simple manner.

For example, after installation of each holding device, the cable or empty pipe is fastened to the holding device by means of a robot, which grabs that cable or empty tube. This holding device has preferably a receptor element into which the cable or empty tube is placed. If necessary, the cable can be firmly fixed in the holding device. This can be necessary, if the holding lengths are different, and the cable has a different sag due to its own weight. It is, however, preferred that the cable or empty tube is inserted into the receptor element so that it can be moved, so that the cable or empty tube can receive more tension.

The holding device in one example is formed as a spring-like clamping element, in which the cable or empty pipe is arrested due to the spring tension. Such an element can be fastened along the longitudinal direction of the canal or pipe system to the side of the branch point.

For inserting the cable or empty tube into a receptor element of the holding device, a robot is unnecessary when, in one construction example of the process, a hook is inserted into the canal or pipe system from the branch point, which grabs the cable or empty pipe and transports the cable or empty pipe into the receptor element of the holding device by means of the hook. Alternatively, a baffle plate is used, which is driven in the longitudinal direction of the canal or pipe system by means of a liquid medium, for example, the water flowing within it. The baffle plate is formed and its movement carried out in such a way, that during its movement the baffle plate positions the cable or empty pipe and transports it into a receptor element of the holding device.

In a preferred model, the holding device is formed as a socket or ring insert, which is centrally fitted into the branch point. Such a holding device shows a receptor element at the side, into which the cable or empty pipe is inserted. In order not to influence the essential function of the canal or pipe system or the branch point, for example, in the form of an inlet, the wall thickness of the socket or ring inserted has to be sufficiently small.

Such a holding device has preferably a spring-like design and is manufactured from stainless steel. Additionally it can have a lengthwise slit which supports the spring action of the socket or ring insert.

For an example of the process according to the invention, the holding device in the form of a socket or ring insert is pressed together before being inserted, and subsequently positioned in such a way that it springs apart in its final position. Thus no glue or epoxy is needed for fastening it.

In a further model, the holding device is fastened to a hoisting rope which is threaded in the longitudinal direction of the canal or pipe system and through the branch point. By means of the hoisting rope the holding device is pulled into the branch position from the canal or pipe system and then fastened.

For fastening the holding device, it is preferred to fill the space between the holding device and the inner wall of the branch point with a liquid plastic bandage or a liquid resin. This can preferably be done by a robot after fitting the holding device; this robot injects the respective medium for forming the plastic bandage or the resin between the holding device and the inner wall of the branch point. To aid good fixation, the holding device preferably has depressions or screw-like ridges on the outside which serve for the intake of the liquid plastic bandage or liquid resin.

Another model provides the application of a bandage around the holding device before installation. By flexing the holding device, the resin is freed.

The holding device can also be used advantageously during a restoration of the pipes at a branch point for restoring the inner wall of the respective point.

BRIEF DESCRIPTION OF THE DRAWINGS

Figure 6:
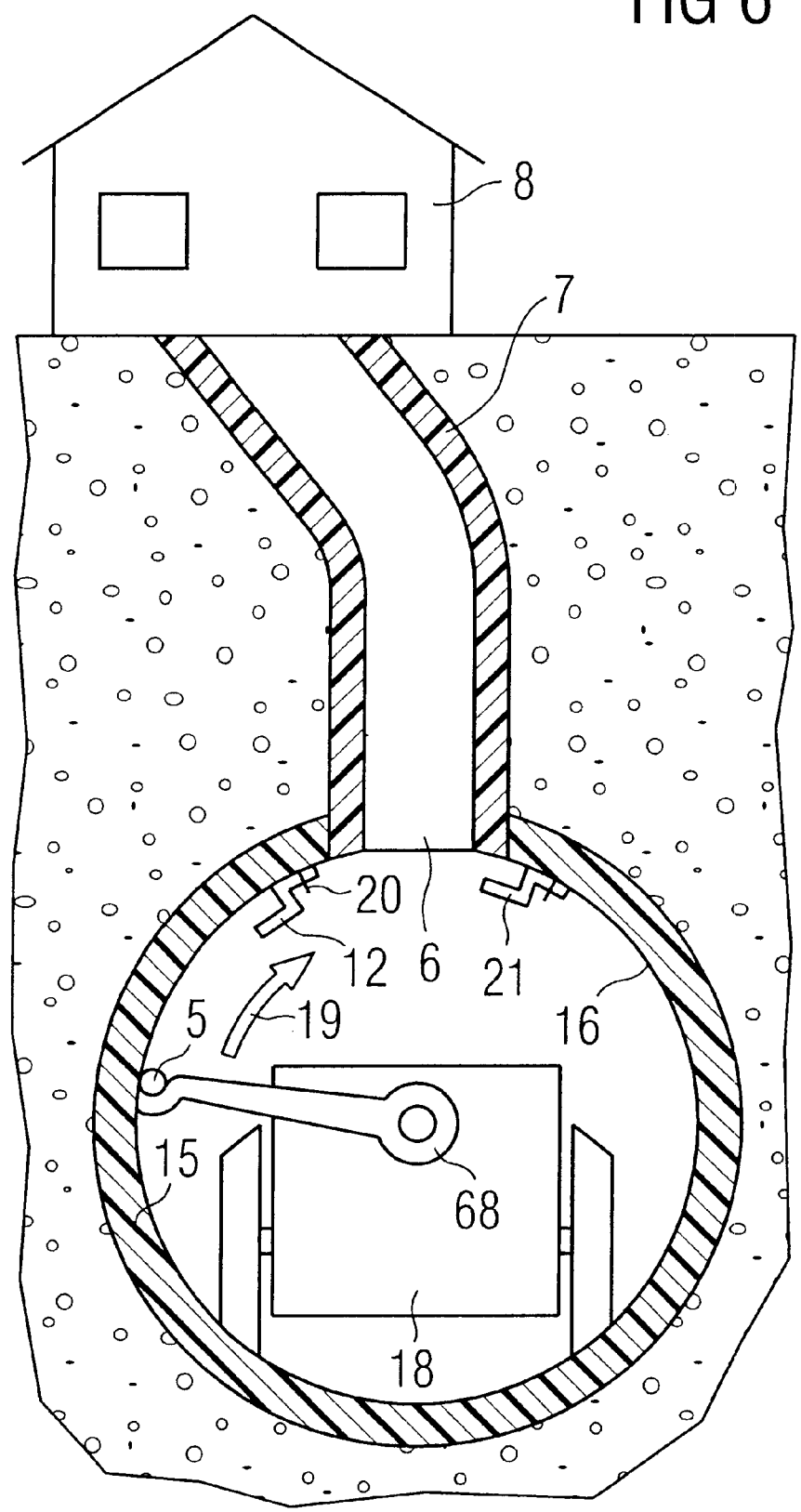
Figure 7:
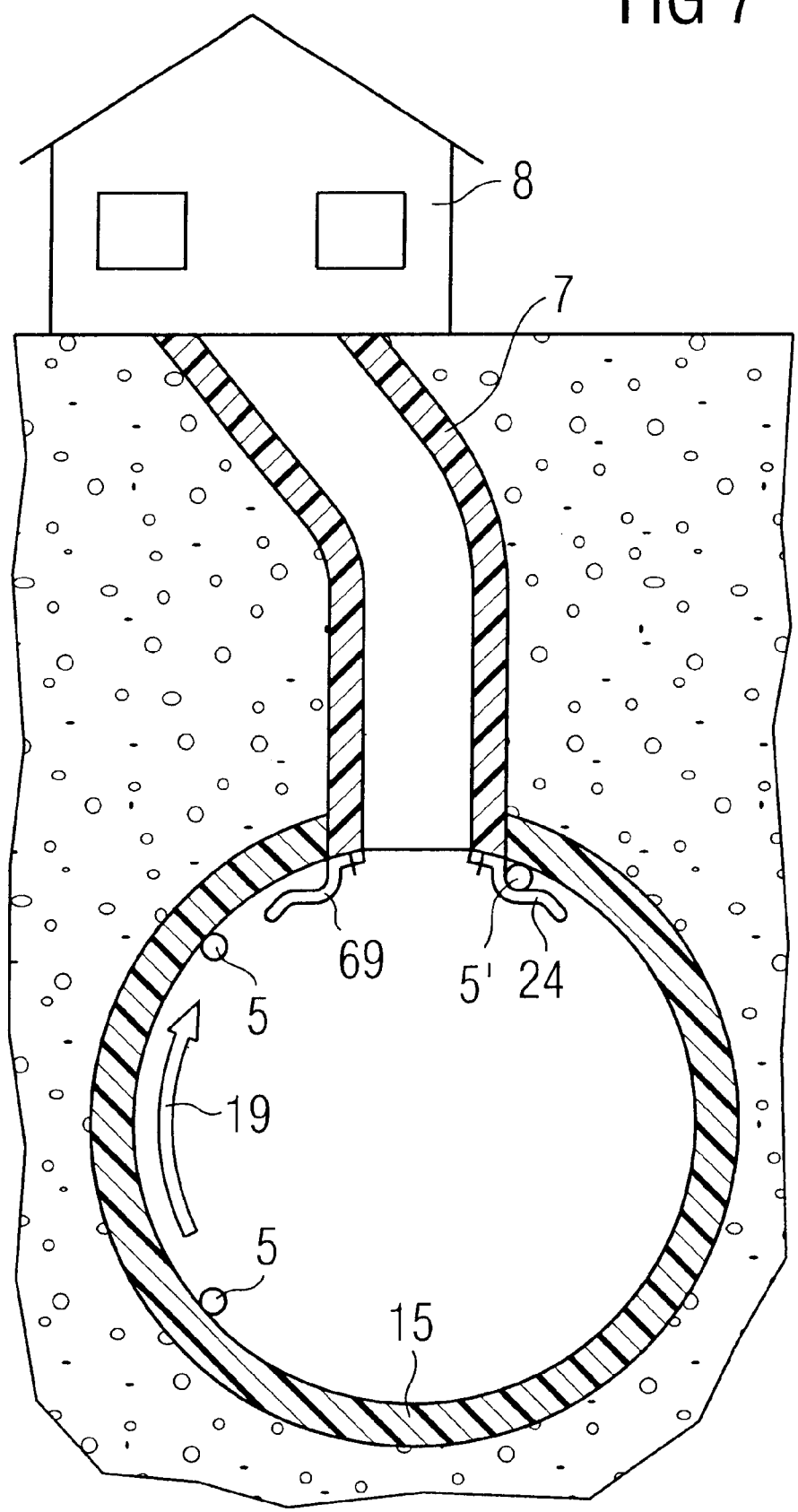
Figure 8:
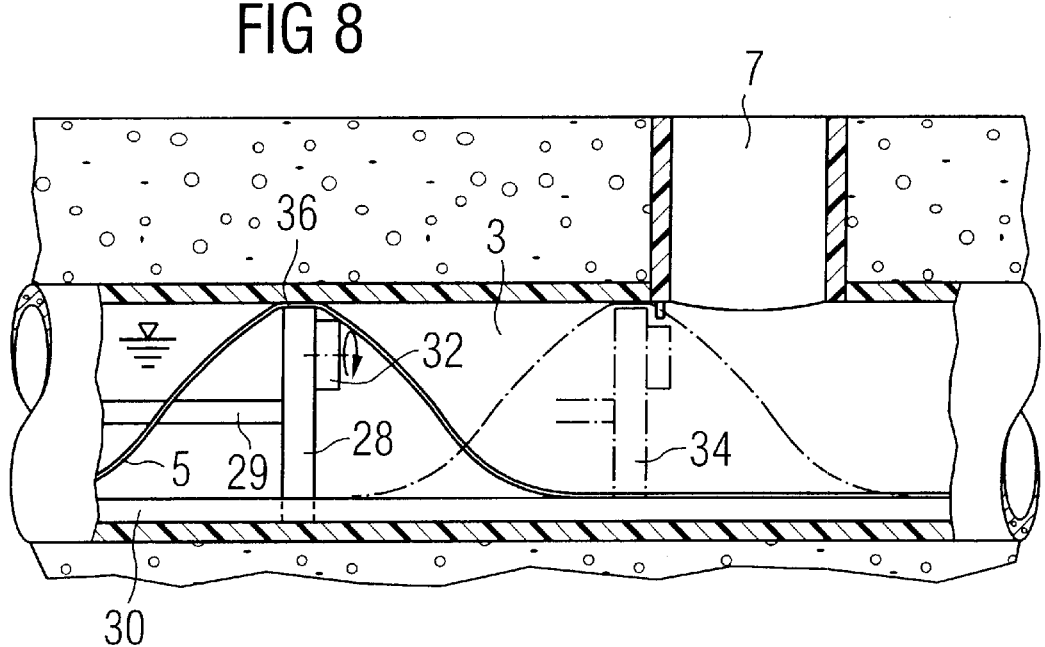
Figure 14:
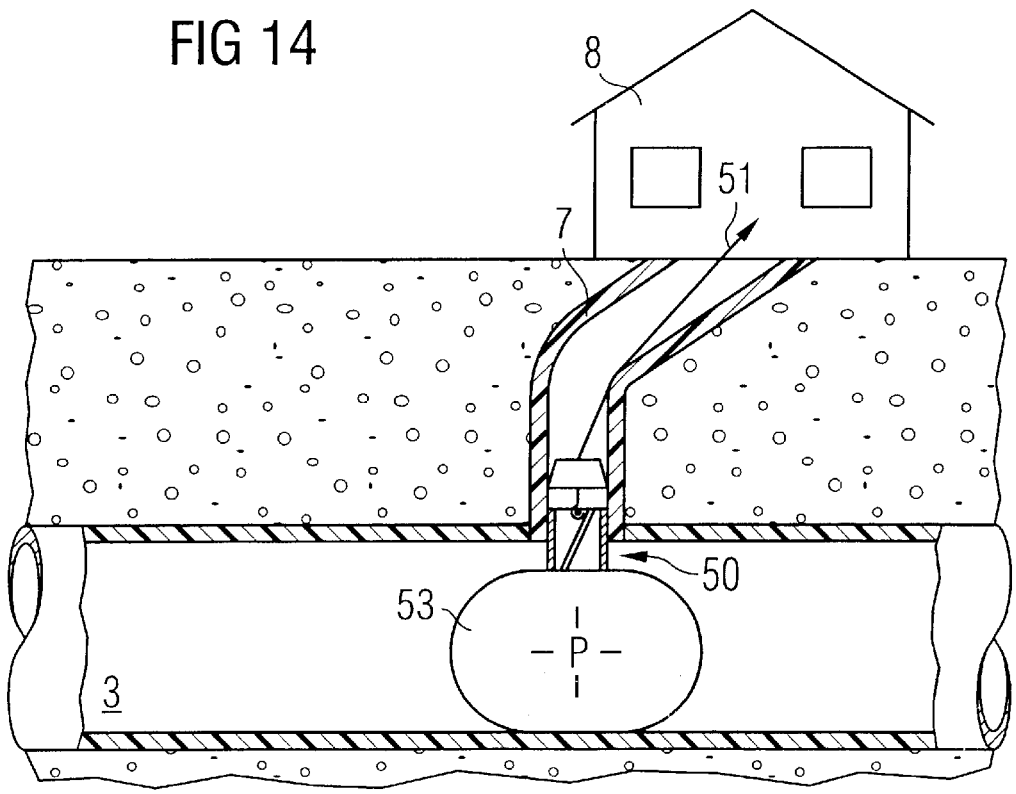
Figure 15:
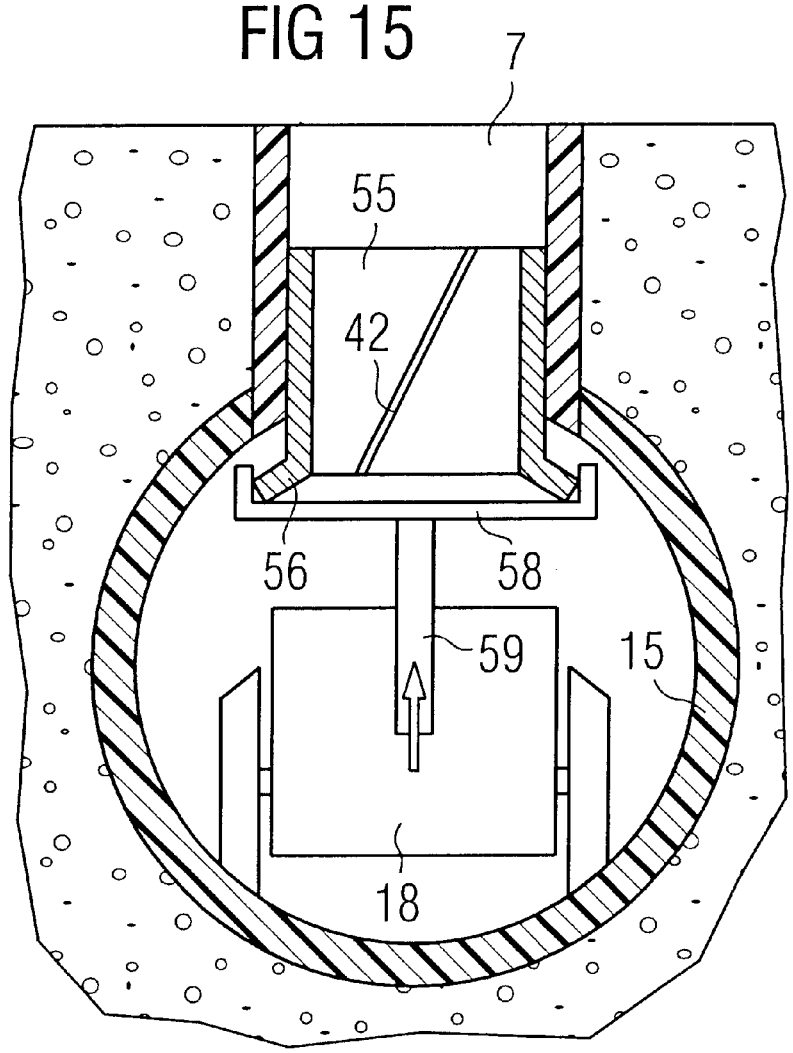
Figure 16:
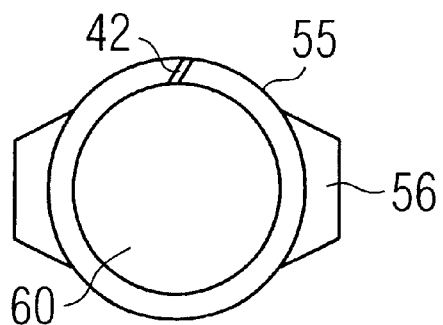
Figure 17:
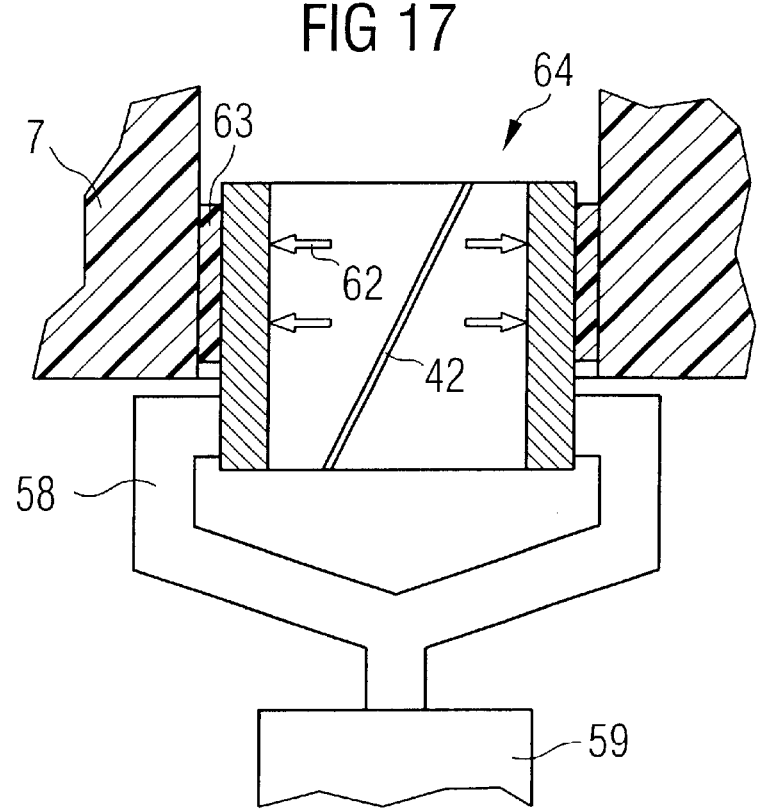
Figure 18:
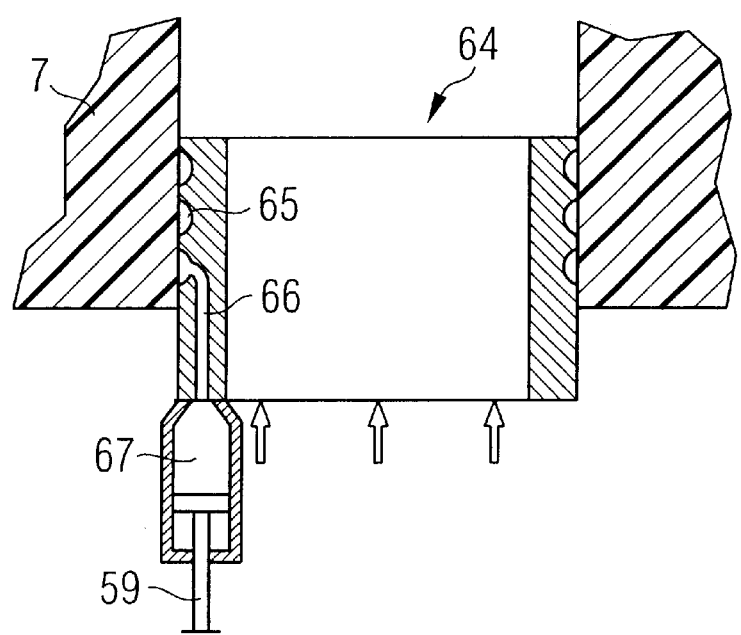

Having thus described the invention in general terms, reference will now be made to the accompanying drawings, which are not necessarily drawn to scale, and wherein:

FIG. 1 is a longitudinal cross-sectional illustration of a waste water canal system with an installed cable, FIGS. 2 to 5 are cross-sectional views of a waste water canal system with different examples of the installation of a cable, FIGS. 6 and 7 are cross-sectional views of a waste water canal with an inlet of a participant during the installation of a cable, FIG. 8 is a further longitudinal cross-sectional illustration of a waste water canal with an inlet of a participant during the installation of a cable, FIG. 9 to 15 are cross-sectional views of a waste water canal with an inlet of a participant during or after, respectively, the installation of a cable, FIG. 16 is a top view of a guide socket, and FIGS. 17 and 18 are cross-sectional views of a guide socket during fitting into a traverse inlet.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is a longitudinal section illustration of a waste water canal or pipe system 1, which has two entry shafts 4. The canal or pipe system 1 is hereinafter generically referred to as a pipe system for purposes of illustration, but not of limitation. Additionally a participant inlet 7 in the form of a traverse inlet coming from above is shown. A cable 5 was anchored in upper area of a main pipe 3 at the anchoring points 2, which are each located in the entry shafts 4. The traverse inlet 7 flows into the main pipe 3 of the waste water pipe system 1 at the branch point 6. In addition to the branch point 6, further branch points can exist, which are not depicted in FIG. 1. At these branch points additional inlets can flow into the main pipe. They also flow in from above or sideways.

FIG. 2 shows a section view of the waste water pipe system 1 from FIG. 1. FIG. 2 shows the main pipe 3 with the inlet 4 and the branch point 6, as well as the installed cable from below. Cable 5 is not guided around the branch point 6 and therefore blocks the free flow from participant 8 from FIG. 1.

FIG. 3, in a similar illustration, shows a variation of the installation of a cable 10, which is fastened by a multitude of fastening elements 9, such as dowel pins, clamps, clips or such, and is guided around the branch point 6. In this type of installation, cable 10 is not anchored. With such an installation of cable 10, the cable must be held simultaneously with the fastening elements 9 and installed. This can, for example, be done with an installation robot.

FIG. 4 shows a example according to the invention for solving the problem of blocking the branch point 6 by the cable as shown in FIG. 2. The holding devices 12, which are fastened to the inner wall of the main pipe 3, are installed in the area of the branch point in such a way, that the cable 5 is guided through the holding device 12 with a defined pre-tension. In this way the branch point 6 is no longer blocked. Additionally, the use of only two holding devices 12 is sufficient, to guide the cable in a defined way around the branch point 6.

Due to its pre-tension and because of the holding devices 12, the cable 5 experiences a sideways deflection 11 and a lateral deflection 13 parallel to the longitudinal direction of the pipe 3, so that the cable is deflected from the middle of the main pipe 3. Cable 5 is only bent minimally by the holding device. When installing an optical cable, this has the advantage of no additional attenuation of the optical fibers due to the fastening or deflection, since a large bending radius is achieved at the fastening.

FIG. 5 is a further example of the installation of cable 5, where the cable experiences a diagonal deflection 14 between the holding devices 12. In this variation several inlets can be distributed on the circumference of main pipe 3. This would result in a "zig-zag" of the cable, where the cable is guided around the inlets.

FIG. 6 shows a cross-section of a main water pipe 15 with an inner wall 16. Inlet 7 flows directly from above into the main water pipe 15. The holding device 12 is fastened on the inner wall 16 by means of a fastening element 20. An additional holding device 21 is fastened on the inner wall, where the position of the cable is determined by its own weight. By means of the two holding devices 12 and 21, the installed cable is guided around branch point 6. The holding devices are made in the form of a clamp. To install cable 17, it is grabbed by a robot arm 68 of a robot 18, lifted up and hooked or fastened into holding device 12. The direction of the movement of the robot arm 68 is designated by movement direction 19. Cable 17 is then preferably fastened at each holding device in such a way, that is can be removed from the holding device, if it is necessary. It is also advantageous, if the cable can be moved within the holding device. The holding devices 12 and 21 can be constructed in a further example in such a way, that additional cables can be added to each holding device. If necessary, the cable can be installed into the holding device in a fixed manner.

FIG. 7 shows other variations of holding devices, here in the form of a spring-like holding device 69 for receiving cable 17, and cable holding device 21 for receiving cable 23. Cable 17 is shown in the position before installation. Cable 17 is located in the bottom of main pipe 15 before it is fastened, and is guided into the holding device 69 along movement direction 19.

FIG. 8 shows an additional longitudinal section of a waste water pipe system, in which a baffle plate 28 is shown, which transports a cable 37 into the holding device. Cable 37 is lifted by means of baffle plate 28 near the holding device and is then positioned. This installation position of baffle plate 28 is designated with the number 34. The baffle plate 28 shows a locking device 32 which aids in securing the cable onto the baffle plate. The baffle plate 28 is guided by a guiding rod system 29 or by a rope. The lifted position of the cable is designated by number 36. An additional guiding rod system 30 is provided which ensures rotation safety of the baffle plate 28. The water pressure of the backed-up water provides transportation and position safety of the baffle plate within the main pipe 3. The baffle plate is moved in the direction of the flow by means of a rod system 29 or by a rope.

Figure 9:
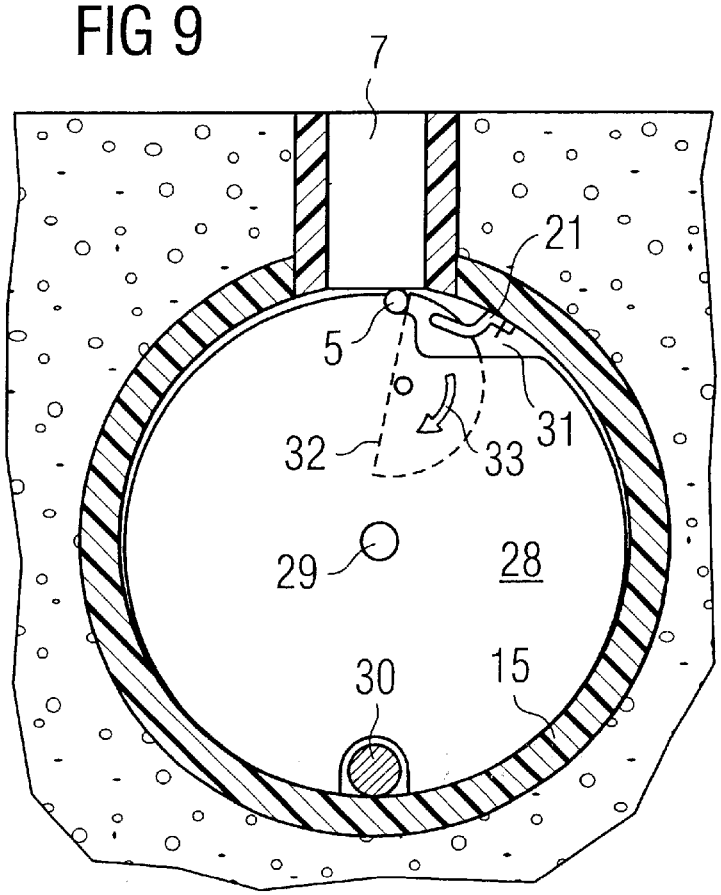

FIG. 9 is cross-sectional illustration of the main water pipe 15 with inlet 7. A cable 23 is fastened onto the baffle plate 28 by means of the locking device 32. The rotation direction of the locking device during installation is designated by number 33. The locking device turns as soon as the installation position is achieved and the locking device is released. The baffle plate 28 is secured against twisting by the guiding rod system 30. A notch 31 in the baffle plate 28 lets the holding device 21 pass during longitudinal movement.

Figure 10:
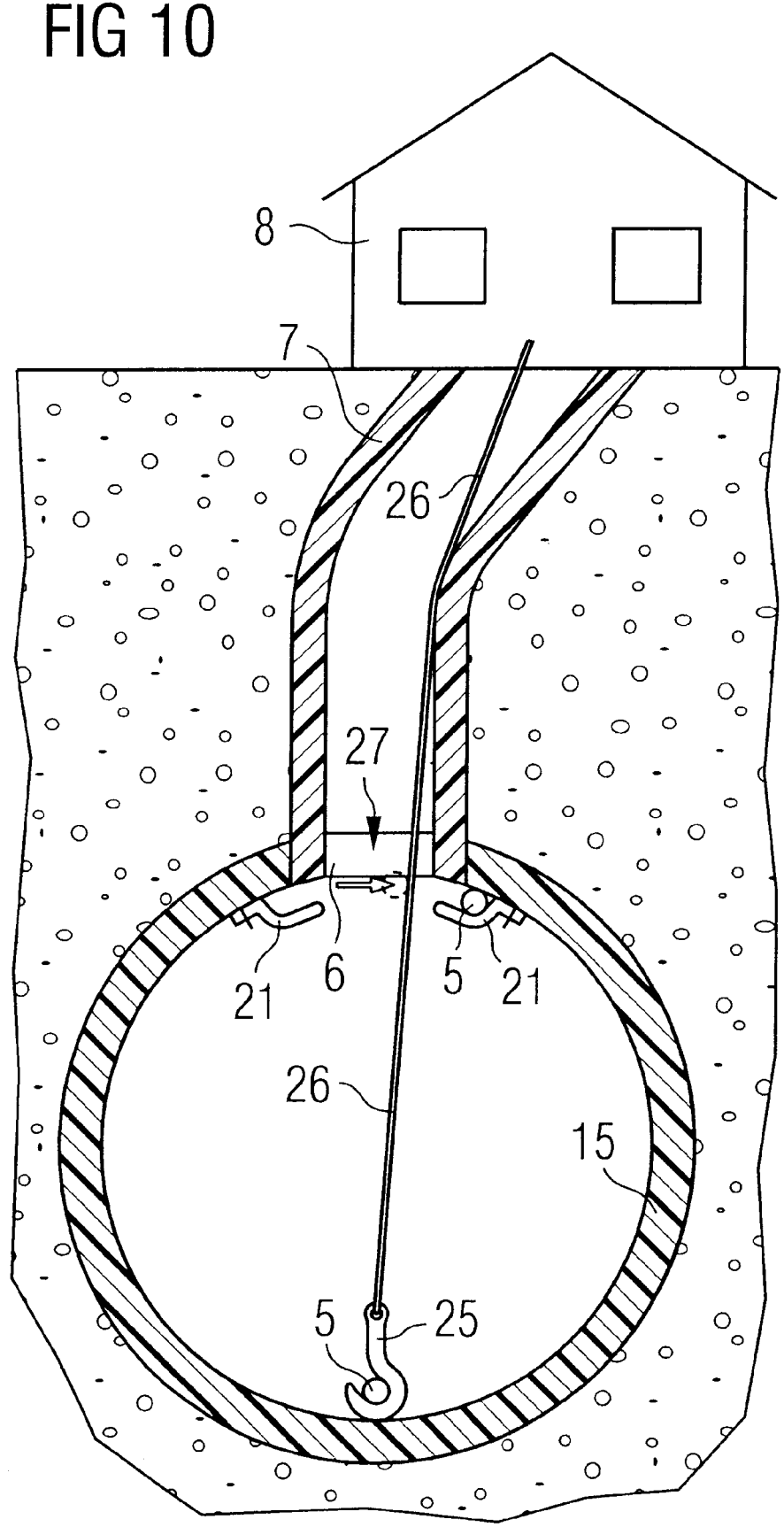

FIG. 10 shows an additional cross-section illustration, where a hook 25 is installed into the main water pipe 15 from the branch point at inlet 7. The illustration shows cable 23 before and after the installation of holding device 21. The hooking of the cable 23 into the holding device 21 is done by means of hook 25, which is inserted from participant 8 and brought into the correct installation position 27 by means of an auxiliary rope 26, so that the cable can be lifted and transported into holding device 21 and is positioned in holding device 21 by means of the pre-tension and its own weight.

Figure 11:
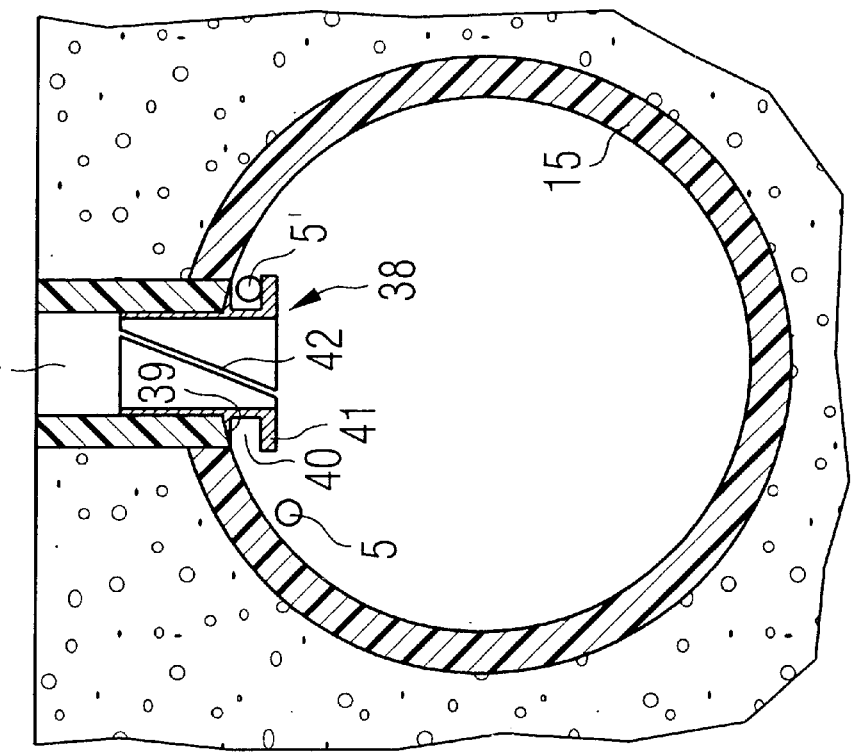

FIG. 11 shows a cross-sectional illustration of holding device 38, which can be directly installed into the traverse inlet 7. Ring 39 serves as length feed stop during installation. The holding device is in the form of a socket or ring insert with a longitudinal slit 42. During cable installation, cable 17 is stretched. By means of the socket in traverse inlet 7 the cable is deflected and is positioned, as can be seen on the right side of the Figure, in a sideways reception in the form of a ring trough 40. The socket 38 has a lengthwise slit and has therefore a certain spring-like characteristic, so that the socket 38 can cling to the wall of inlet 7. The stop ring 39 and the lower ring 41 increase the spring effect. The two rings form a ring depression 40 which takes up cable 23 and positions it.

Socket 38 is preferably formed in such a way, that it does not obstruct the essential function of the waste water canal system. The function of the inlet canal 7 should also not be obstructed. The cable 23 is lifted in the area of the inlet, whereby the sagging of the cable is diminished. Socket 38 is preferably made from corrosion resistant and springy material such as stainless steel. The wall thickness of the socket should be small in order to prevent cross-section reduction in traverse inlet 7.

Figure 12:
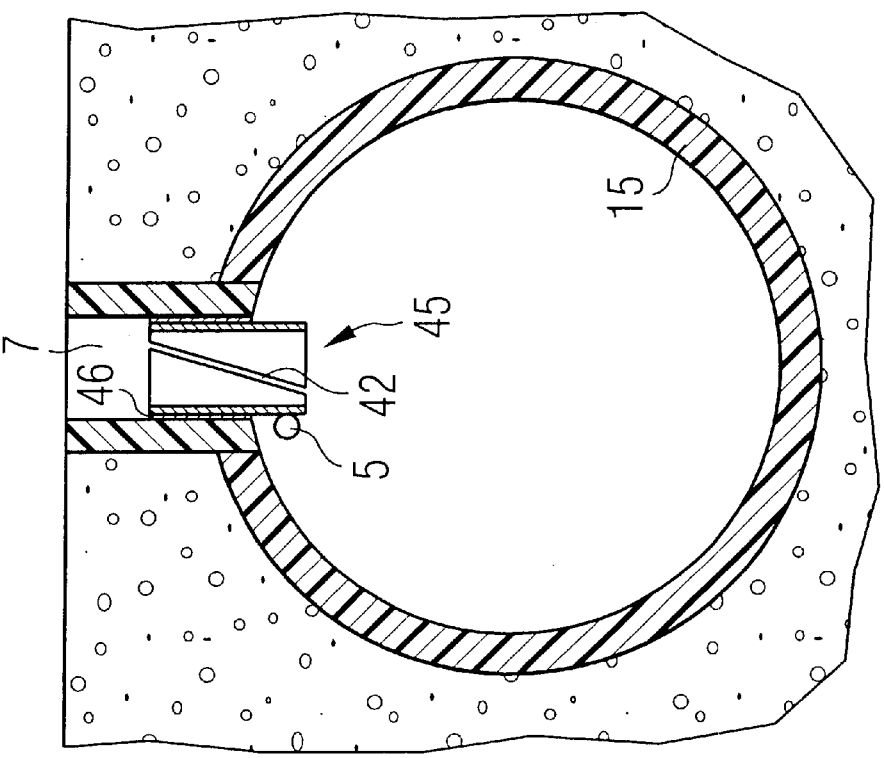

FIG. 12 shows a cross-section of the application of a guide socket 45 into the traverse inlet 7. Fixing it into the traverse inlet is done in this variation by means of a glue 46. This can be a curable epoxy resin. The resin can be contained in a webbing. A curing agent can be used during installation, or the curing can be done by a UV lamp or with steam. Additionally, a cable 70 is shown which is not positioned in a clearance of the guide socket, but maintains its shown position by means of its pre-tension. The glue 46 enables a permanent adhesion.

Figure 13:
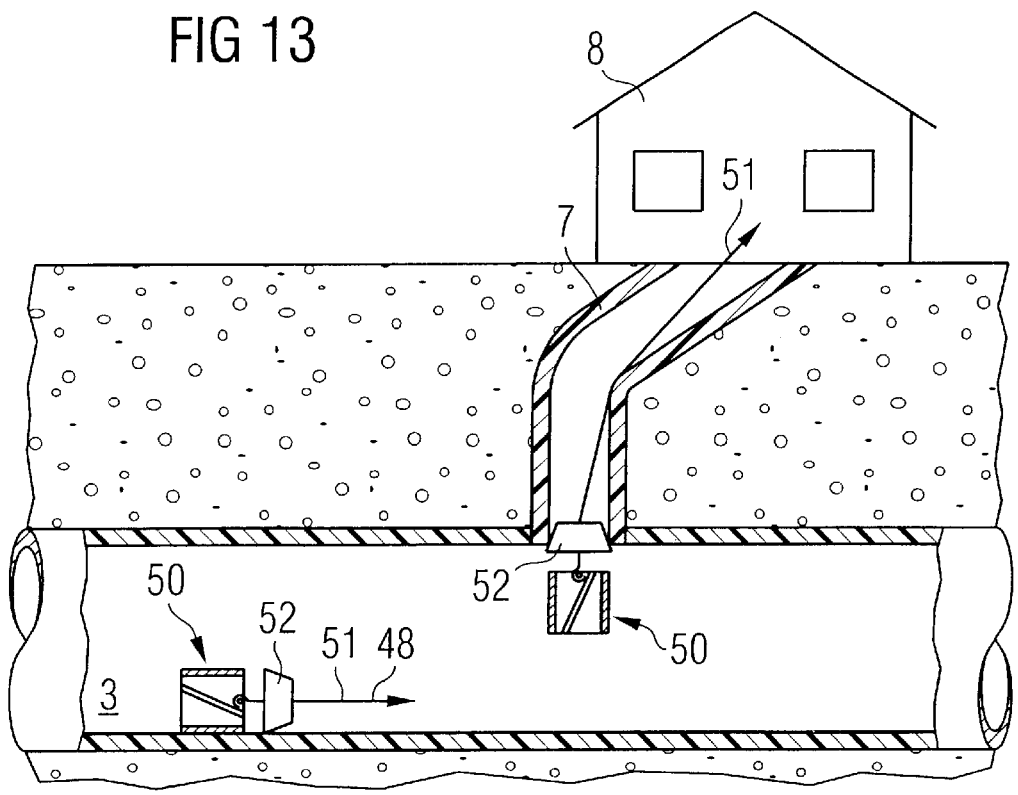

FIG. 13 shows another possible installation of a ring insert or guide socket 50, respectively, by using a pulling rope 51, without the use of a robot. The pulling rope is inserted into pipe 3 and into the traverse inlet. For the installation, the rope is pulled in direction 48 towards inlet 7. The guide socket 50 is threaded into the traverse inlet 7 by means of the pulling rope 51 and is anchored there. A guide cage 52 avoids the tilting of socket 50.

FIG. 14 shows the insertion of the guide socket 50 into the traverse inlet. The socket can be positioned correctly by means of the pulling rope 51. It is also possible to press the socket 50 into the traverse inlet by means of an installation balloon 53. For this process, the balloon is positioned below the socket and inflated. After installation, the pulling rope 51 is removed. The pulling rope 51 positions the socket 50 vertically for installation. For this, the pulling rope is fastened to the upper area of the socket 50.

FIG. 15 shows a cross-section of the installation of a guide socket 55 into the traverse inlet 7 by means of an installation robot 18. During installation the guide socket 55 is compressed by a clamp 58 located at a guide rod system 59. This makes the insertion into a traverse inlet much easier. The guide shanks 56 serve as an installation aid. The guide socket is positioned by the robot, after insertion of the socket clamp 58 is removed by the robot. The socket springs apart and fixes itself by means of the spring-like action within the traverse inlet. The guide shanks 56 additionally serve to guide the cable during installation and to transport it into its fixed position. This is done automatically as soon as the cable is stretched during installation.

FIG. 16 shows a top view of the guide socket 55 with a free passage 60. The guide shanks 56 are provided with bevels and roundness. Therefore no dirt deposits can adhere during operation of the waste water pipe system.

FIG. 17 shows a cross-section of the installation of a guide socket 64 into the traverse inlet 7. Again a robot with a guide rod system 59 and a clamp 58 is used. This compresses and positions the socket. After positioning the guide rod system is removed. The socket springs apart and a container containing a hardener is destroyed or otherwise opened. Although not shown, the container containing the hardener would typically be disposed between the socket and the sidewall of the inlet. The spring action is designated by the number 62. The hardener infiltrates the epoxy and hardens the plastic bandage in the form of the glue bandage 63. In this way the position of the socket is fixed.

FIG. 18 shows a cross-section of the installation of the guide socket 64 into the traverse inlet 7, again with the aid of an installation robot. The robot or its guide rod system 59, respectively, injects a resin which hardens between the socket and the pipe wall into a space 65, by means of a mixing die 67. The empty space is filled by the glue and thus sealed. For better filling, distribution and anchoring of the glue with the socket, the socket is provided with screw-like ridges or depressions, which form a suitable space 65. The liquid resin can equalize irregularities of the inner wall of the pipe system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A process for installing a cable or empty pipe into a pipe system Comprising:
   anchoring an element selected from the group consisting of a cable and an empty pipe with the pipe system at a minimum of two anchoring points spaced in a longitudinal direction within the pipe system such that the element is placed under tension; and
   fastening the element to an inner wall of the pipe system with at least one socket fitting into a branch point such that the element is guided by the at least one socket around the branch point due to the tension on the element, wherein the at least one socket is compressed prior to and while fitting the at least one socket into the branch point, and subsequently releasing the at least one socket to spring into an uncompressed position.

2. A process according to claim 1 further comprising inserting the element prior to anchoring the element at the anchoring points, and installing the at least one socket into the branch point prior to fastening the element to the at least one socket.

3. A process according to claim 1 wherein fastening the element with at least one socket comprises grabbing the element with a robot and then fastening the element with the at least one socket with the robot.

4. A process according to claim 1 further comprising filling a space between the at least one socket and an inner wall of the branch point with at least one of a liquid plastic bandage and a liquid resin.

5. A process according to claims 4 wherein filling the space comprises injecting a respective medium for forming at least one of a plastic bandage and a resin between the at least one socket and the inner wall of the branch point after the at least one socket is fitted into the branch point.

6. A pipe system comprising:
   at least one pipe;
   an inlet connected to the at least one pipe at a branch point;
   an element selected from the group consisting of a cable and an empty pipe extending through at least a portion of the at least one pipe;
   at least two anchoring points spaced in a longitudinal direction within the at least one pipe, wherein the element is anchored to each anchoring point such that the element is placed under tension; and
   at least one socket fastened to an inner wall of the at least one pipe proximate the branch point, wherein the element is guided by the at least one socket around the branch point due to the tension on the element, the at least one socket has a slit through a sidewall and fits into the branch point, the at least one socket having a resilient characteristic, thereby allowing resilient flexing of the at least one socket.

7. A pipe system according to claim 6 wherein the element is attached to the at least one socket in a movable way.

8. A pipe system according to claim 6 wherein the at least one socket comprises a receptor into which the element is inserted, the receptor opening laterally relative to the longitudinal direction of the at least one pipe.

9. A pipe system according to claim 6 wherein said at least one socket comprises a wall having a wall thickness that is sufficiently small such that flow through the pipe system proceeds unimpeded.

10. A pipe system according to claim 6 wherein the at least one socket comprises stainless steel.

11. A pipe system according to claim 6 further comprising at least one of plastic bandage and a resin disposed within a space between the at least one socket and an inner wall of the branch proximate the branch point.

12. A pipe system according to claim 11 wherein the at least one socket comprises a plurality of ridges that define intervening depressions for receiving at least one of a liquid plastic bandage and a liquid resin.

13. A pipe system according to claim 6 wherein the at least one socket restores an inner wall of the branch at the branch point.

14. A process for installing a cable or empty pipe into a System comprising:

anchoring an element selected from the group consisting of a cable and an empty pipe within the pipe system at a minimum of two anchoring points spaced in a longitudinal direction within the pipe system such that the element is placed under tension; and fastening the element to an inner wall of the pipe system with at least one holding device proximate a branch point such that the element is guided through the at least one holding device and around the branch point due to tension on the element, wherein fastening the element with the at least one holding device comprises grabbing the element with a robot and rotating the element in an arc with the robot, thereby fastening the element to the at least one holding device.

15. A pipe system according to claim 14 wherein the at least one holding device comprises a receptor into which the element is inserted.

16. A pipe system according to claim 14 wherein the at least one holding device is fastened to the inner wall of the at least one pipe so as to be laterally disposed with respect to the branch point relative to the longitudinal direction of the at least one pipe.

17. A pipe system according to claim 14 wherein the at least one holding device comprises a resilient portion which holds the element as a result of spring tension.

18. A process for installing a cable or empty pipe into a pipe system comprising:

anchoring an element selected from the group consisting of a cable and an empty pipe within the pipe system at a minimum of two anchoring points spaced in a longitudinal direction within the pipe system such that the element is placed under tension; and fastening the element to an inner wall of the pipe system with at least one holding device proximate a branch point such that the element is guided through the at least one holding device and around the branch point due to tension on the element, wherein fastening the element with at least one holding device comprises driving a baffle plate with a fluid medium longitudinally through the pipe system such that the element is positioned by the baffle plate and transported into a receptor of at least one holding device.

* * * * *